United States Patent [19]

Wulff

[11] Patent Number: 4,507,823
[45] Date of Patent: Apr. 2, 1985

[54] FISH PROCESSING MACHINE WITH CONTROLLING MEANS FOR THE PROCESSING TOOLS

[76] Inventor: Hermann Wulff, Müllergrund 4a, 2400 Lübeck 16, Fed. Rep. of Germany

[21] Appl. No.: 458,176

[22] Filed: Jan. 17, 1983

[30] Foreign Application Priority Data

Jan. 23, 1982 [DE] Fed. Rep. of Germany ....... 3202140

[51] Int. Cl.³ .............................................. A22C 25/14
[52] U.S. Cl. ........................................................ 17/55
[58] Field of Search ........................... 17/55, 56, 58, 61

[56] References Cited

U.S. PATENT DOCUMENTS 1,459,273 6/1923 Waugh ................................... 17/56

Primary Examiner—Willie G. Abercrombie
Attorney, Agent, or Firm—Edward F. Levy

[57] ABSTRACT

A control device for the processing tools controlled by cams with regard to their start of operation and their processing course is provided in fish-processing machines. The cam comprises, as already known, a main cam and one or more cam segments adjustable on the main cam. To enable a quick and easy adjustment of the tools even while the machine is running and thus achieve optimum working efficiency and results, the cam is so constructed that the main cam is associated to a coupling member via an intermediate drive by means of a chain or toothed-belt drive, the coupling member itself being associated to the cam segment(s). A change in the position of the cam segment 17 relative to the main cam 15 when the machine is running may be performed by changing the spreading of the chain or toothed-belt drive which connects the intermediate drive with the coupling member 34.

6 Claims, 4 Drawing Figures

FISH PROCESSING MACHINE WITH CONTROLLING MEANS FOR THE PROCESSING TOOLS

BACKGROUND OF THE INVENTION

1. Field of the Invention

The invention relates to a fish-processing machine comprising at least one processing tool, which is controlled with regard to its processing startpoint resp. moment of its engaging the fish and its processing course by means of a cam, the control path of which is composed of a driven main cam and at least one cam segment arranged directly adjacent and which can change its position relative to the main cam.

2. Description of Prior Art

When fish are being processed mechanically is must be considered that the goods to be processed inter alia are not only different with regard to their size but also have different anatomical proportions depending on their species. The fish of one species basically have the same proportions which makes it possible to undertake an individual setting of the tools by evaluating one of the measurements taken from the fish to be processed, e.g. thickness, length or height. This is achieved according to current practice by appropriate adjusting or setting means whose adjusting characteristic is predetermined constructively corresponding to the proportions of the fish to be processed.

In respect of this, as can be quite easily imagined, a corresponding universal adaptability of the processing tools to differing species of fish requires high expenditure. Therefore, due to economic considerations this is only practised on a reduced scale in a manner in which the tool control of such a processing machine is provided with adjustable programs which are adapted to the anatomy or predominantly related fish species and then make their processing in certain size ranges possible.

In a known device of such type (e.g. DE-PS No. 29 27 583) electronic controlling means are used which enable an adjustment by program selection. This device, however, is very expensive and therefore only economically employable in machines with sufficient processing capacity.

Therefore it has been tried to provide possibilities for adjusting single tools of a fish-processing machine which enable, within bounds, the processing of fish of different proportions in a single machine.

A machine for cleaning the belly cavity of fish is known (see DK-OS No. 4472/75) wherein each fish is led to a belly slitting and cleaning tool by orientation in relation to its nose, lying on its back and tail first, the course of movement of said tool being controlled by a cam or curve. This comprises a basic cam and one or several cam segments which can coaxially change their position in relation to the basic cam and are bolted to the basic cam in the desired position.

This enables an adjusting of the machine for one species of fish, which adjustment or setting can then be maintained independent of size in the processing range determined by the construction. The change to another species of fish in which, e.g. the length of the belly cavity in relation to the length of the fish is different, is performed during the standstill of the machine by adjusting the cam segment(s).

OBJECTS OF THE INVENTION

It is therefore a main and essential object of the invention to enable an adjustment of the tools whilst the machine is running, and thus an optimal processing result whilst constantly controlling the influence of the adjustment. It is further an essential object of the invention to provide a device which is operable in a similar way, with the help of which the cam characteristic can be influenced.

SUMMARY OF THE INVENTION

This object is achieved according to the invention in further developing the known fish-processing machine as described in the introductory paragraph by positively associating the main cam to an intermediate drive which is associated via a chain or toothed-belt drive to a coupling member which is pivotal coaxially to the axis of the main cam and which acts on the cam segment, the pulling and pushing run of the chain or toothed-belt drive being adjustably pressed outwardly with the help of at least one tensioning means.

The advantages to be achieved by the invention essentially lie in highly improved efficiency of the use of a fish-processing machine thus equipped. This improvement occurs because the necessary adaptation or resetting time is smaller. Also, less skilled personnel are enabled to make sure that the quality of the product remains practically constant.

The resetting and adjusting can be realized particularly simply by means of a lockable adjusting lever which is associated, e.g. connected to the tensioning means for the chain or toothed-belt drive in an appropriate manner.

The tensioning means can comprise a tightener pulley or a tensioning roller which influence the pulling run and are connected to the adjusting lever, and a chain adjuster which biases the pushing run.

Tensioning means comprising two tension elements which tension the pushing and pulling run, the position of the elements being controllable by a cam plate connected to the adjusting lever are provided in an embodiment which can be used independent of the direction of rotation of the cam. This has the advantage that the adjusting forces for the tensioning means may be held free from additional resilience.

The beginning or end of the processing movement of each controlled processing tool may be controlled expediently by a rigid connection between the cam segment and the coupling member.

Advantageously, the cam segment can be mounted on the main cam outside the axis thereof and be connected to the coupling member. It is thereby possible to influence the adjusting characteristic and/or the beginning or end of the functional movement of the processing tool.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

In the drawings.

DETAILED DESCRIPTION OF THE PREFERRED EMBODIMENTS

Figure 1:
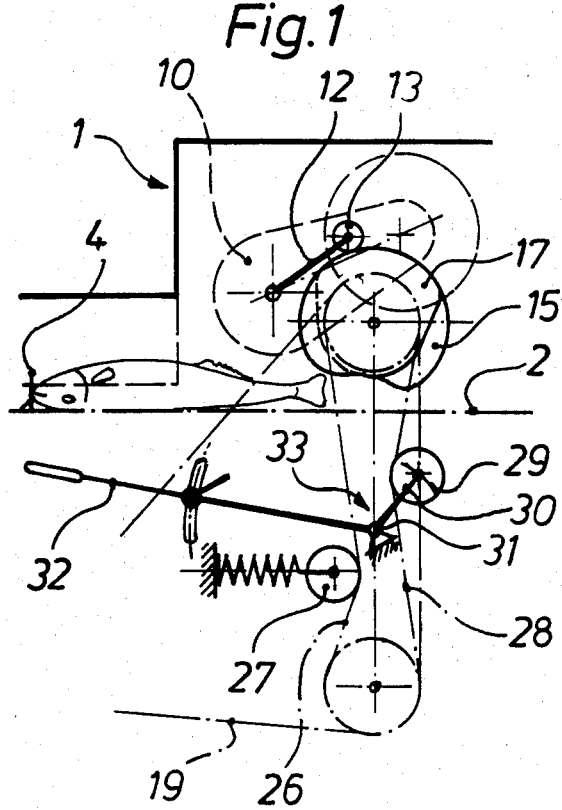
FIG. 1 shows a total view of an embodiment of a control device installed in a fish-gutting machine.
Figure 2:
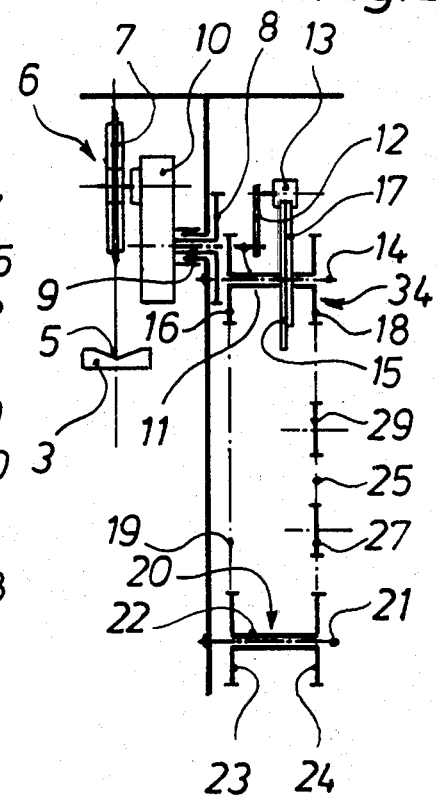
FIG. 2 shows a side view of the device.

A fish conveyor 2 is arranged in a frame 1 only allusively indicated of a fish-gutting machine and comprises a carrier chain driven to run endlessly having single members provided with profiled receiving prisms 3 in the running direction having prismatic recesses 5. Head carriers or drivers 4 are located on the fish conveyor 2 at distances from each other which are larger than the length of the largest fish to be processed and extend upwards into the prismatic recesses 5. A slitting and clearing resp. gutting tool 6 is positioned above the path of the fish conveyor 2 and arranged in the plane of symmetry of the prismatic recesses 5. The tool 6 comprises a circular knife 7 which is driven in an appropriate manner via a driving wheel 8 and provided with cleaning resp. gutting means, the knife being mounted to rotate in a pivoted link 10 which is pivotable around a hollow shaft 9 attached to the frame 1. The pivoted link is rotatingly fastened to a shaft 11 to which a crank arm 12 with a cam or guide roller 13 is attached. The cam roller 13 rests biased on the periphery of a main cam 15 which is mounted rotatably about an axle 14 fixed to the frame, the cam having a common hub with a chain gearwheel 16. There is further a cam segment 17, mounted in bearings on the axle 14, which segment rests against the disc body of the main cam 15, and has a common hub with a chain gearwheel 18. The chain gearwheel 16 is connected, by means of a driving chain 19 introducing the driving force, to an intermediate drive 20 comprising two chain wheels 23, 24 attached to a common hub 22 mounted to rotate about an axle 21 attached to the frame. The chain wheel 24 is associated to a coupling member 34 via a chain 25 whose length is overdimensioned, the member 34 comprising the chain wheel 18 connected to the cam segment 17. The chain 25 is held tensioned by tensioning means 33, its pushing run 26 being held under tension by means of a resilient chain adjuster 27, while a tightener pulley 29 engages its pulling run 28 and is arranged at a free end 30 of a two-armed lever pivotal about a pivot point 31, the other free arm of the lever being formed as an adjusting lever 32 which can be arrested in an appropriate manner in each position.

Figure 3:
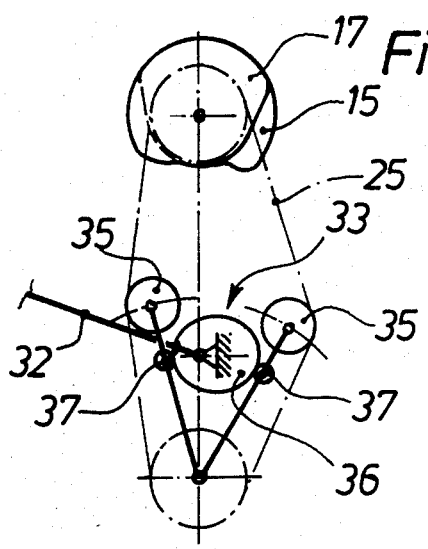
FIG. 3 shows a variation of an embodiment for a device which can be used independent of the direction of rotation.

In the embodiment of FIG. 3 the tensioning means 33 comprise two rod-shaped tensioning elements 35 which are arranged pivotally and symmetrically to a connecting line between the axles 14 and 21 and support themselves via cam rollers 37 on a cam plate 36 associated to the adjusting lever 32.

Figure 4:
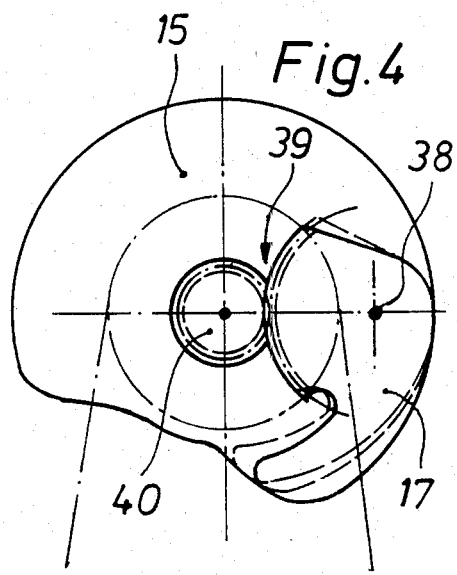
FIG. 4 shows another variation of an embodiment for influencing the adjusting characteristics of the device.

In the embodiment of FIG. 4 the cam segment 17 is pivotally mounted about an axle bolt 38 arranged eccentrically and engages by means of a toothing 39 the coupling member 34 formed, in this case, as a toothed wheel 40.

In order to demonstrate the mode of operation it is supposed that the working result of the slitting and gutting tools 6 is unsatisfactory because they dip into the fish too late. Such a deficiency can be overcome by means of the device according to the invention, the functional procedure being the following:

Starting from the effect which is desired an earlier engagement of the slitting and gutting tool 6 is to be achieved. As can be seen especially from FIG. 1 it is necessary to this end to turn the cam segment 17 in a clockwise direction in respect of the main cam 15. This can be achieved by pivoting the adjusting lever 32 anticlockwise, the result of this being that the tensioning roller 29 associated to the lever 32 is correspondingly pivoted, the pulling run 28 of the chain 25 thus being tightened. The amount of chain necessary for the stronger excursion is made up from the pushing run 26 by yielding of the chain adjuster 27. In this process the chain 25 supports itself via the chain wheels 18, 24 and 23 of the intermediate drive 20 in respect of the chain gearwheel 16 associated to the main cam 15 so that the desired relative displacement between the main cam and the cam segment 17 is obtained.

In the embodiment of FIG. 3 the tensioning elements 35 are pressed outwardly due to the shape of the cam by turning the cam plate 36 by means of the adjusting lever 32 so that the chain 25 is always held under tension.

It can be seen from the embodiment according to FIG. 4, which shows a possibility for influencing the cam characteristic, that by turning the toothed wheel 40 clockwise a rise in the periphery of the main cam 15 can be achieved, while an anticlockwise turn causes a lowering thereof.

The idea on which the invention is based is not limited to influencing the moment in which a tool is initiated to start to work or pivoted outwardly to stop its working function. It is, however, also possible to control a further cam segment with the help of a further chain drive which can be influenced as described and which also uses the axles 14 and 21, so that the functional resp. processing startpoint and/or the moment in which the tool leaves the fish or and adjusting combination for controlling one of these two features and/or the cam characteristic can be selected in one apparatus.

What is claimed is:

1. A fish processing machine comprising at least one processing tool, means mounting said processing tool for movement into and out of engagement with the fish to be processed, cam means for controlling the the processing startpoint and the working course of said processing tool, said cam means including a main cam rotatably mounted on a main cam axis and having a cam surface coupled to said processing tool for controlling movement of the latter, and a cam segment mounted immediately adjacent to said main cam for independent turning movement relative to said main cam, intermediate drive means for rotating said main cam and said cam segment, first belt drive means connecting said intermediate drive means to said main cam, and second belt drive means connecting said intermediate drive means to said cam segment for normal synchronous rotation of said cam segment with said main cam, without relative movement therebetween, said second belt drive means having a pushing run and a pulling run, and selectively-movable tensioning means for applying tension upon a run of said second belt means, whereby to cause relative movement between said cam segment and said main cam and vary the cam surface of the latter.

2. A fish processing machine according to claim 1 in which said tensioning means includes lockable adjusting lever means.

3. A fish processing machine according to claim 2 in which said tensioning means comprises tightener pulley means connected to said adjusting lever means and engaging the pulling run of said second belt drive means, and adjusting means biasing said pushing run.

4. A fish processing machine according to claim 2 in which said tensioning means comprises a pair of tensioning elements tensioning said pushing run and pulling run, and a cam plate connected to said adjusting lever means for controlling the position of said tensioning elements.

5. A fish processing machine according to any one of claims 1, 2 or 3, which includes coupling member means rotatably mounted on said main cam axis and connected by said second belt drive means to said intermediate drive means, and in which said cam segment is rigidly connected to said coupling member means.

6. A fish processing machine according to any one of claims 1, 2 or 3, which includes coupling member means rotatably mounted on said main cam axis and connected by said second belt drive means to said intermediate drive means, and in which said cam segment is mounted on said main cam means offset from the axis thereof and is operatively connected to said coupling member means.

* * * * *